United States Patent [19]

Boden et al.

[11] 4,314,963

[45] Feb. 9, 1982

[54] METHOD AND A DEVICE FOR PRODUCING SHAPED ARTICLES FROM A MULTI-COMPONENT REACTION MIXTURE

[75] Inventors: Heinrich Boden, Leverkusen; Bernhard Rentz, Leverkusen; Johann Niggemann, Leverkusen; Gerhard Just, Leichlingen, all of Fed. Rep. of Germany

[73] Assignee: Bayer Aktiengesellschaft, Bayerwerk, Fed. Rep. of Germany

[21] Appl. No.: 174,471

[22] Filed: Aug. 1, 1980

[30] Foreign Application Priority Data

Aug. 18, 1979 [DE] Fed. Rep. of Germany ....... 2933553

[51] Int. Cl.$^3$ .......................... B29F 1/03; B29D 27/00
[52] U.S. Cl. .................................... 264/328.6; 264/37; 264/39; 264/53; 264/328.17; 264/DIG. 83; 422/233; 422/134; 422/135; 425/543; 425/817 R
[58] Field of Search ................... 264/DIG. 83, 54, 51, 264/328.6, 328.17, 39, 37, 53; 422/133, 134, 135; 425/543, 817 R

[56] References Cited

U.S. PATENT DOCUMENTS

| | | | |
|---|---|---|---|
| 3,353,918 | 11/1967 | Perrin | 521/917 X |
| 3,706,515 | 12/1972 | Keuerleber et al. | 264/DIG. 83 |
| 4,115,299 | 9/1978 | Mühle | 521/917 X |

FOREIGN PATENT DOCUMENTS

| | | | |
|---|---|---|---|
| 2746188 | 4/1979 | Fed. Rep. of Germany | 422/133 |
| 1376485 | 9/1964 | France | 264/DIG. 83 |

OTHER PUBLICATIONS

Conway, French, Asso. Edt. "The Story Behind Liquid Injection Molding of Polyurethanes.". In *Plastics Engineering*, Jan. 1975, pp. 25–29.

*Primary Examiner*—Philip Anderson
*Attorney, Agent, or Firm*—Gene Harsh; Joseph C. Gil; Lyndanne M. Whalen

[57] ABSTRACT

The present invention relates to a method and a device for producing shaped articles from a multi-component reaction mixture which forms, for example, polyurethane, epoxy resin, polyester resin or polyamide, by mixing at least two of the individual components in at least two premixing chambers to form multi-component reaction mixture and these mixtures are subsequently mixed in a single-stage mixing chamber to form a mixture which is introduced into a shaping zone in which it is cured to form the shaped article.

10 Claims, 3 Drawing Figures

METHOD AND A DEVICE FOR PRODUCING SHAPED ARTICLES FROM A MULTI-COMPONENT REACTION MIXTURE

BACKGROUND OF THE INVENTION

Metering and mixing devices which operate at either low pressure or high pressure have been known for some time. Some devices of this type allow the metering rate to be altered in a controlled manner for one or more reactants during the metering process. In this process, for example, the stoichiometric ratio is changed (or one reactant is exchanged continuously for another) in order to produce zones having differing properties in the resulting shaped articles. With a low pressure metering device which is provided with a stirrer, all reactants are introduced into the large-volume stirrer mixing chamber and mixed therein in one stage. Premixing of reactants in a preselected, exact metering ratio to form a multi-component reaction mixture and subsequent mixing (which is controlled relative to the metering ratio) with at least one second, pre-mixed multi-component reaction mixture, which is metered in the stoichiometrically correct ratio is not possible. In addition, low pressure stirrer mixers can be used for the intermittent production of, for example, solid, bubble-free shaped articles only when using relatively slowly reacting mixtures which do not require rinsing or cleaning of the mixing chamber between two mold filling operations. If it is necessary to rinse or clean the mixing chamber, the air present in the large-volume mixing chamber is introduced into the reaction mixture at the beginning of each mixing operation. This results in bubbles and a partially foamy structure, at least at the beginning of each filling operation, which make the shaped article unserviceable. Another disadvantage lies in the sealing of the stirrer shaft which is sensitive to leakages and to pressure.

The high pressure metering devices which are commercially available at present allow the metering rate of individual reactants to be changed relative to each other. They also allow a continuous synchronous change in the metering rate of several reactants at a constant metering ratio. The associated injection mixheads which are currently used have their injection and mixing conditions adapted to a substantially constant metering rate and to a substantially constant viscosity of the reactants due to the preselection and tight adjustments of the cross-sections of the injection nozzles. As a result, a marked reduction in the metering rate of one reactant with a constant nozzle cross-section at the mixing chamber inlet, inevitably leads to a corresponding drop in the metering pressure and thus in the mixing power. The mixing of the reactants in the injection chamber is no longer satisfactory.

Injection mixers having self-cleaning design, in conjunction with high pressure metering devices, are known to have numerous advantages over low pressure devices. For example, highly reactive systems having setting times as low as one second can be processed. Additionally, it is not necessary to rinse the mixing chamber. The volume of the mixing chamber can be kept extremely small at a few cubic centimeters and solid, substantially bubble-free reaction mixtures can be consequently produced, if necessary, from the beginning of the operation to the end. It is also possible to mix up to 6 reactants in one mixhead under the substantially constant metering conditions described above. However, if these conditions are to be changed during the mixing operation, the results are unsatisfactory.

The object of the invention is to propose a method and a device for the production of polymeric shaped articles from multi-component reaction materials such as those for forming, for example, polyurethane, epoxy resin, polyester resin or polyamide shaped articles wherein flowable reactants (which, if necessary, can be metered by means of high pressure pumps and which optionally contain fillers as well as optionally flowable additives), are mixed together in such a way that it is possible to significantly influence the metering and mixing operations.

DESCRIPTION OF THE INVENTION

Figure 1:
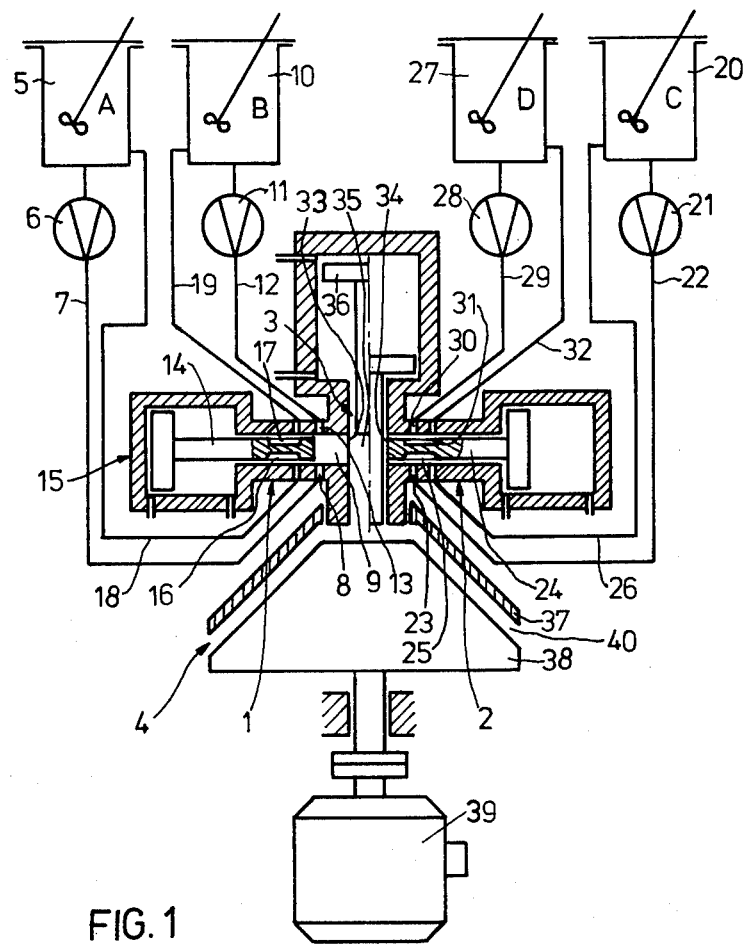
FIG. 1 shows a device which operates in a self-cleaning manner and is equipped with a dynamic second mixer.

The above objects are achieved by
(a) feeding at least two flowable reactants into at least two separate premixing zones, thereby producing a flowable multi-component reaction mixture in each of the premixing zones, and
(b) feeding each flowable multi-component reaction mixture into an at least single-stage second mixing zone and
(c) mixing the multi-component reaction mixtures together.

The invention also relates to a device for mixing at least four reactants comprising
(a) storage containers for each of said reactants,
(b) feed lines leading from two of said storage container via metering pumps to a first mixing chamber,
(c) feed lines leading from the other two of said storage container via metering pumps to a second mixing chamber, and
(d) the outlets of said first mixing chamber and said second mixing chamber merging into a common subsequent mixing chamber.

Two or more reactive preliminary mixtures are produced in this way so that the intensity can be controlled very well during the subsequent or second mixing. The method according to the invention allows, for example, premixing of the reactants during the processing of highly reactive systems, and allows the desired reaction initiation to be introduced between these reactants. Only after these reactants have been premixed will the resulting reaction mixture in the still flowable condition meet another premixed reaction mixture produced under similar conditions in the second mixing stage which is referred herein as "subsequent mixing zone." A blend of reaction mixtures will thus be formed in the second mixing stage, i.e., in the subsequent mixing zone. This division into two or more parallel premixing zones in a first stage and into at least one common subsequent mixing zone in a second stage, gives the routineer much more control. Better results are also obtained. Uncontrolled reactions which generally occur when all reactants are introduced simultaneously into a single mixing zone can be avoided by the method according to the invention. The premixing zone is not therefore used for the production of a mixture of components which are unreactive toward each other, but rather of components which react together in this stage. This does not rule out the possibility of adding to the premixture or to a component for the premixture, fillers or other additives which react only in the subsequent mixing zone. With the process of the invention it is possible to adapt two or more reactive premixtures to each other in such a way that these mixtures react further upon being brought together to form the end product.

If there are a relatively large number of parallel premixing stages, several subsequent mixing stages can be arranged in parallel. The intermediate mixtures thus produced could then be fed into a third mixing stage. Several subsequent mixing stages arranged in tandem are also feasible for the premixture or for an intermediate mixture.

The method according to the invention is very broad and there are several alternative ways for the routineer to conduct it.

According to a first embodiment, the metering ratio at least of the reactants introduced into one of the premixing zones will be kept constant. The metering ratio of all reactants introduced into the premixing zones can obviously also be altered during the mixing process. Since the components must be accurately metered, particularly when using components which are highly reactive, it is preferable to keep the metering ratio of the reactants introduced into at least one of the premixing zones constant as a reference component.

According to another embodiment, at least one of the reaction mixtures produced is introduced into the subsequent mixing zone after a time delay and only mixed with another reaction mixture in the subsequent mixing zone for a predetermined time interval. This mode of operation affords an exceptional advantage. For example, in the production of shaped articles, which are to be provided with zones having differing properties, a reaction mixture is first produced for example in the first premixing zone and is initially only subjected to subsequent mixing with itself in the subsequent mixing zone. Then, another reaction mixture is simultaneously fed into the subsequent mixing zone from the second premixing zone at a desired moment in time and is subjected to intensive whirling therein with the reaction mixture introduced from the first premixing zone. The premixing operation can finally be ended simultaneously for both premixtures. Alternatively, one or other of the reaction mixtures can be produced alone for a further period and released into the mold via the subsequent mixing zone.

Another variation of the method according to the invention involves feeding at least two formed premixtures to the subsequent mixing zone synchronously in time and mixing them with each other. This variation is recommended particularly when extremely sensitive components have to be processed so as to give a minimum of stopping points for interference factors.

A particular embodiment of the method involves keeping the metering rate at least of two formed reaction mixtures constant during entry into the subsequent mixing zone. This measure allows various reaction mixtures to be supplied in differing proportions and under differing injection pressures.

The principle of restricting the variations to ensure reliable handling is, of course, preferable. The rates at which the individual reaction mixtures are metered into the subsequent mixing chamber can also differ. Finally, the metering rate of at least one of the reaction mixtures produced can advantageously be altered during introduction into the subsequent mixing zone. This variation allows the production of shaped articles having differing properties over various zones.

The device according to the invention is based on having storage containers for each component, from which feed pipes lead via metering pumps to a mixhead and merge into mixing chambers. The novelty lies in the fact that at least two premixing chambers arranged in parallel are provided, the outlets of which merge into at least one common subsequent mixing chamber.

The devices can thus have a compact structure and, can be designed so as to be substantially self-cleaning.

Movable cleaning pistons are preferably arranged in the premixing chambers. The subsequent mixing chamber may optionally also be fitted with an ejection piston. The faces of the cleaning pistons are advantageously adapted to the contour of the walls of the subsequent mixing chamber.

The cleaning pistons and the ejection piston have the function of freeing the premixing chambers and the subsequent mixing chamber from residues of mixture upon completion of the mixing process. The otherwise necessary rinsing operation is thus avoided in a manner generally known in the art. Furthermore, when mixing is taking place in only one premixing chamber, the premixing chamber cleaning piston of the second chamber has the additional function of filling out the second premixing chamber so that no mixture can pass from the first mixing chamber into the second.

According to one particular embodiment, the subsequent mixing chamber is followed by an additional subsequent mixing chamber. Known dynamic or static mixers are suitable for this purpose. Premixtures which are difficult to mix therefore become processible.

Throttles which are optionally adjustable are preferably arranged between the premixing chambers and the subsequent mixing chamber.

The throttles act as nozzles and allow an injection pressure to build up.

According to an alternative embodiment, the cross-sections of the premixing chamber outlets correspond to the cross-sections of the associated cleaning pistons. In other words, the cross-sections of the outlets correspond substantially to the cross-sections of the premixing chambers so it is possible to eject the remains of mixture contained in the premixing chambers into the subsequent mixing chambers without leaving any residue.

In this case, the faces of the cleaning pistons are preferably designed in such a way that, in the cleaning position, they match the contour of the subsequent mixing chamber and form a continuous surface with it.

The above-mentioned devices allow a design which is self-cleaning and in which a stirrer can be dispensed with so that problems caused by contamination or by pressure drops due to stirrer shaft seals which are not tight cannot arise.

Reference will now be made to the drawings.

In FIG. 1, the device consists of the premixing apparatuses 1,2 which are arranged functionally parallel to each other, the following subsequent mixing apparatus 3 and an additional dynamic, subsequent mixer 4 of the type which is particularly suitable for the production of vehicle tires since it can be used at the same time to distribute the mixture into the characteristic mold.

The component A flows from a storage container 5 via a metering pump 6 which is arranged in a feed pipe 7, to the premixing apparatus 1 and is injected via an injection opening 8 into the premixing chamber 9. In a similar manner, the component B passes from the storage container 10 via a metering pump 11 which is arranged in a feed pipe 12 to the premixing apparatus 1 and passes via an injection opening 13 into the premixing chamber 9. A cleaning piston 14 is movably guided in the premixing chamber 9 by means of a hydraulic drive mechanism 15. Return grooves 16,17 arranged in the cleaning piston 14 are able to connect the injection openings 8,13 in the cleaning position of the piston 14 to the return pipes 18,19 which merge into the storage containers 5,10.

The component C flows from a storage container 20 via a metering pump 21 which is arranged in a feed pipe 22 to the premixing apparatus 2 and is injected via an injection opening 23. For the sake of clarity, the cleaning piston 24 is illustrated in the cleaning position in the premixing apparatus 2 so that the injection opening 23 merges into a return groove 25 whence flows component C via a return pipe 26 back into the storage container 20. The component D passes in a similar manner from a storage container 27 via a metering pump 28 which is arranged in a feed pipe 29 to the premixing apparatus 2 and passes via an injection opening 30 into a return groove 31 to which is connected a return pipe 32. The return pipe 32 merges into the storage container 27.

The components pass from the premixing chamber 9 and the premixing chamber which belongs to the premixing apparatus 2 but is filled in the illustration by the cleaning piston 24, through the outlets 33,34 into a subsequent mixing chamber 35 of the subsequent mixing apparatus 3. An ejection piston 36 is guided in the subsequent mixing apparatus 3. Its left half is shown in the mixing position and its right half in the ejection position.

The reaction mixture produced from the premixtures flows from the subsequent mixing chamber 35 into an additional dynamic subsequent mixer 4 so that subsequent mixing takes place in two stages. The subsequent mixer 4 consists of two rotationally symmetrical baffle plates 37,38, one of which is rigidly connected to the subsequent mixing apparatus 3 while the other is provided with a rotational drive mechanism 39. The two baffle plates 37,38 are arranged co-axially with the axis of the subsequent mixing apparatus 3 and form a mixing gap 40 between them. The mixing gap 40 simultaneously serves to supply the reaction mixture to the mold (not shown).

Figure 2:
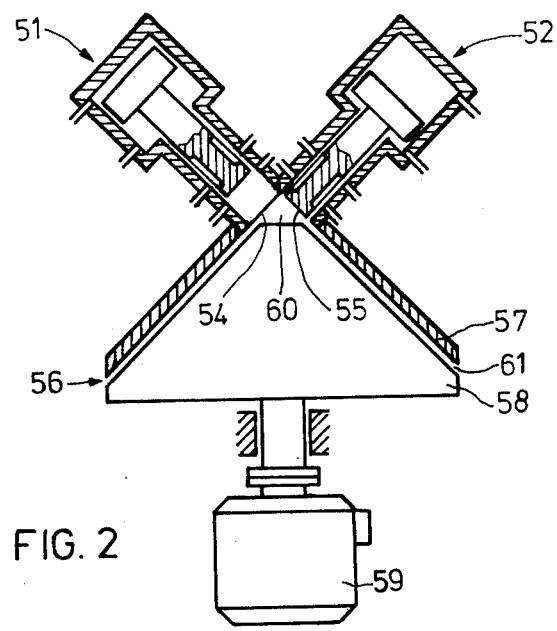
FIG. 2 shows a second embodiment of the device with a dynamic, second mixing device.

In FIG. 2, the structure of the premixing apparatuses 51,52 corresponds to those in FIG. 1 so they will not be described in detail here. The only difference lies in the fact that the premixing apparatuses 51,52 are arranged at an angle of 90° to each other and their outlets 54,55 merge into an injection subsequent mixing chamber 60 which does not need an injection piston and passes directly into a dynamic subsequent mixing apparatus 56 of the type shown as an additional unit in FIG. 1. The subsequent mixing apparatus 56 consists of two co-axial conical plates 57,58, of which one plate 57 is rigidly connected to the premixing apparatuses 51,52. The plate 58 is provided with a rotary drive mechanism 59 and its tip is blunted. The injection subsequent mixing chamber 60 is located here and extends into the mixing gap 61 of the dynamic subsequent mixing apparatus 56 formed between the plates 58,57.

Figure 3:
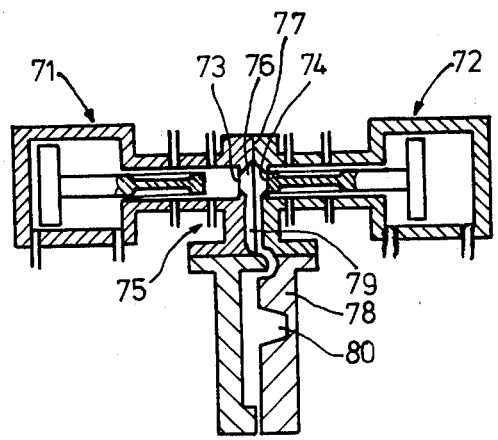
FIG. 3 shows a third embodiment of the device with self-cleaning premixing chambers and a deformable, subsequent mixing chamber.

In FIG. 3, the premixing apparatuses 71,72 also correspond to those shown in FIG. 1. However, the outlets 73,74 of the mixing apparatuses 71,72 designed as throttles merge into a subsequent mixing apparatus 75 having a mold separating plane 77 of a mold 78 passing through its subsequent mixing chamber 76. A casting channel 79 passes from the subsequent mixing chamber 76 into the cavity 80 of the mold 78. As the mold 78 is opened, the remains of the mixture which have cured in the subsequent mixing chamber 76 and in the casting channel 79 can be removed from the mold together with the molded article. With the apparatus according to FIG. 3, it is possible to arrange an additional static subsequent mixer in the casting channel in a known manner.

The design of the injection premixer 1,2; 51,52; 71,72 is certainly not restricted to the examples illustrated in FIGS. 1, 2 and 3. Any injection mixer for multi-component reaction systems can be used, which mixers are preferably designed to be self-cleaning. Mixer heads of this type are known in various forms.

EXAMPLES

Two examples were set up. Example 1 relates to the present invention and Example 2 relates to a conventional method.

One highly activated polyurethane multi-component reaction system for the production of molded articles of low stiffness and one highly activated polyurethane multi-component reaction system for the production of molded articles of high stiffness were processed simultaneously and at differing metering ratios to each other. In Example 1 (tests 1.1 to 1.3) a multi-step mixing device according to FIG. 3 was used. In Example 2 (tests 2.1 to 2.3) the four reaction components concerned were mixed in a conventional, one-step injection mixing device (similar to the premixers 1,2; 51,52; 71,72 described in FIGS. 1 to 3). This mixing device was equipped in known manner with four injection nozzles on one level for the four reaction components and it was connected with the mold cavity via a casting channel. The mechanical properties of the resulting molded articles from both Examples are summarized in Table 1.

The following reaction components were used:

REACTION MIXTURE R1 (SOFT SETTING)

Component A1

94 parts by weight of a reactive polyether polyol mixture (OH number: 211, viscosity at 25° C.: 700 mPa.s), 4 parts by weight of monofluorotrichloromethane, 2 parts by weight of dichloromethane.

Component B1

Polyisocyanate (4,4'-diisocyanatodiphenylmethane containing carbodiimide groups; NCO-content: 26.5%, viscosity at 25° C.: 80 mPa.s).

REACTION MIXTURE R2 (HARD SETTING)

Component A2

Reactive polyether polyol mixture (OH number: 426, viscosity at 25° C.: 1500 mPa.s).

Component B2

95 parts by weight of a polyisocyanate (4,4'-diisocyanatodiphenylmethane containing carbodiimide groups; NCO-content: 26.5%, viscosity at 25° C.: 80 mPa.s), 5 parts by weight of dichloromethane.

METERING RATIOS

Reaction Mixture R1

A1:B1 = 97 parts by weight: 53 parts by weight

Reaction Mixture R2

A2:B2 = 88 parts by weight: 100 parts by weight.
The following process parameters were kept constant in all of the tests:

| | | |
|---|---|---|
| Metering pressures: | all components | 170 to 180 bars |
| Temperature of the raw materials: | all components | approx. 35° C. |
| Total metering rate: | | 350 g/sec. |
| Flow rate in casting channel: | | 4.5 m/sec. |
| Mold: | aluminum mold, interior measurements: | 700 × 200 × 4 mm |
| Temperature of mold: | | 60° C. |

EXAMPLE 1

Test 1.1

Multi-step mixing device according to FIG. 3
1 part   reaction mixture R1
2 parts  reaction mixture R2

Test 1.2

Multi-step mixing device according to FIG. 3
1 part   reaction mixture R1
1 part   reaction mixture R2

Test 1.3

Multi-step mixing device according to FIG. 3
2 parts  reaction mixture R1
1 part   reaction mixture R2

EXAMPLE 2

Test 2.1

Mixer head with four injection nozzles for four reaction components
1 part   reaction mixture R1
2 parts  reaction mixture R2

Test 2.2

Mixer head with four injection nozzles for four reaction components
1 part   reaction mixture R1
1 part   reaction mixture R2

Test 2.3

Mixer head with four injection nozzles for four reaction components
2 parts  reaction mixture R1
1 part   reaction mixture R2

TABLE 1

Mechanical properties of molded articles which were produced by simultaneous mixing of two different polyurethane multi-component reaction systems:

| Test No. | | 1.1 | 2.1 | 1.2 | 2.2 | 1.3 | 2.3 | |
|---|---|---|---|---|---|---|---|---|
| Reaction Mixtures | R2 (hard) | R1:R2 = 1:2 | R1:R2 = 1:2 | R1:R2 = 1:1 | R1:R2 = 1:1 | R1:R2 = 2:1 | R1:R2 = 2:1 | R1 (soft) |
| Mixing systems one-step | x | | x | | x | | x | x |
| multi-step | | x | | x | | x | | |
| Bulk density (kg/m$^3$) according to DIN 53 420 | 1148 | 1130 | 1129 | 1124 | 1105 | 1116 | 1024 | 1006 |
| Tensile strength (mPa) according to DIN 53 504 | 32.6 | 25.7 | 24.5 | 22.7 | 21 | 20.4 | 16.1 | 13.3 |
| Elongation at rupture (%) according to DIN 53 504 | 150 | 160 | 167 | 161 \| 148 \| 134 | 174 | 185 | 187 | 224 |
| Hardness Shore-A according to DIN 53 505 | 98 | 98 | 97 | 97 | 97 | 97 | 97 | 91 |
| Hardness Shore-D according to DIN 53 505 | 69 | 62 | 58 | 58 | 53 | 51 | 46 | 34 |
| Tension stress at 50% strain (mPa) according to DIN 53 504 | 27.7 | 19.3 | 17 | 16.3 | 13.6 | 12.1 | 9.9 | 6.3 |

What is claimed is:

1. In a method of producing polymeric shaped articles from a multi-component reaction mixture by mixing the individual components to form the multi-component reaction mixture and introducing this mixture into a shaping zone in which it is cured to form the shaped article, the improvement wherein:
   (a) at least two flowable reactants are each fed to at least two separate premixing zones, and a flowable multi-component reaction mixture is produced in each of the premixing zones, and
   (b) these flowable multi-component reaction mixtures are fed to an at least single-stage subsequent mixing zone and mixed together therein.

2. A method according to claim 1, characterized in that the metering ratio of at least the reactant introduced into one of the premixing zones is kept constant.

3. A method according to claim 1, characterized in that at least one of the reaction mixtures produced is released into the subsequent mixing zone after a time delay and is only mixed for a predetermined time interval with another reaction mixture in the subsequent mixing zone.

4. A method according to claim 1, characterized in that at least two of the premixtures produced are supplied to the subsequent mixing zone synchronously in time and mixed together.

5. A method according to claim 1, characterized in that the metering rate at least of two reaction mixtures produced is kept constant as they flow into the subsequent mixing zone.

6. A method according to claim 1, characterized in that the metering rate at least of one of the reaction mixtures produced is altered during the introduction into the subsequent mixing zone.

7. A device for mixing at least four reactants comprising (a) storage containers for each of said reactants, (b) feed lines leading from two of said storage container via metering pumps to a first mixing chamber, (c) feed lines leading from the other two of said storage container via metering pumps to a second mixing chamber, and (d) the outlets of said first mixing chamber and said second mixing chamber merging into a common subsequent mixing chamber.

8. A device according to claim 7, characterized in that the subsequent mixing chamber is followed by an additional subsequent mixing chamber.

9. A device according to claim 7 or 8, characterized in that movable cleaning pistons are arranged in the premixing chambers and that the subsequent mixing chamber is also equipped with an ejection piston which is movable therein.

10. A device according to claim 7 or 8, characterized in that throttles are arranged between the premixing chambers and the subsequent mixing chamber.

* * * * *